L. R. VAN HOOSE.
WHEELED MOTORCYCLE ATTACHMENT.
APPLICATION FILED MAY 26, 1916. RENEWED OCT. 9, 1920.
1,382,942.
Patented June 28, 1921.
2 SHEETS—SHEET 2.
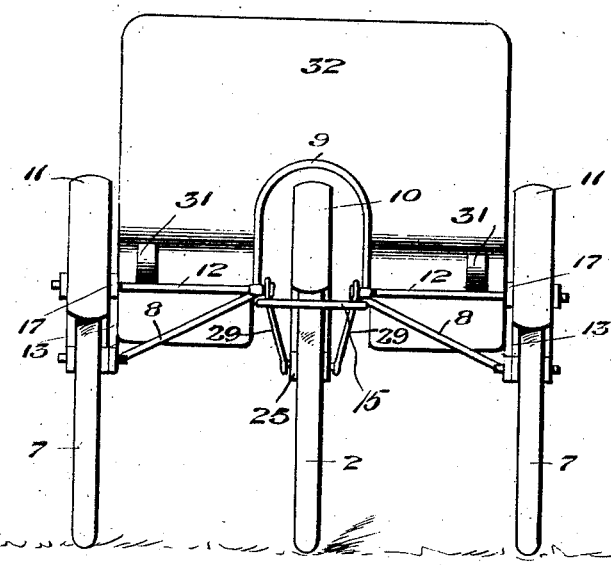
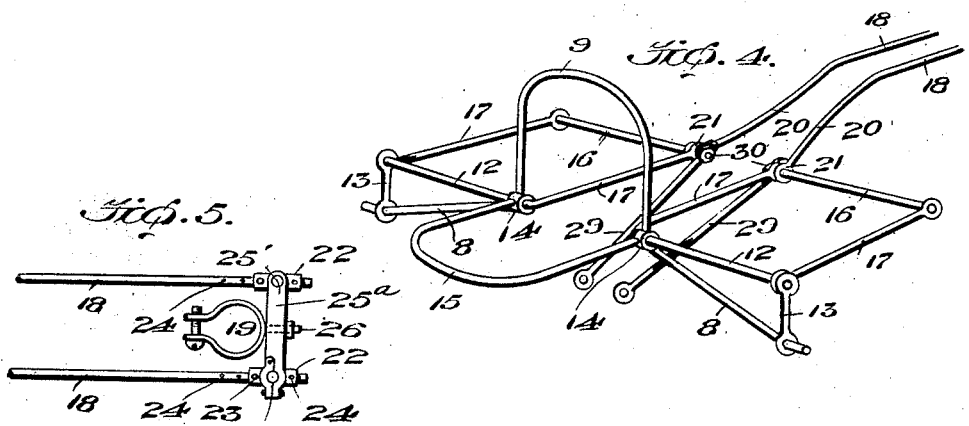

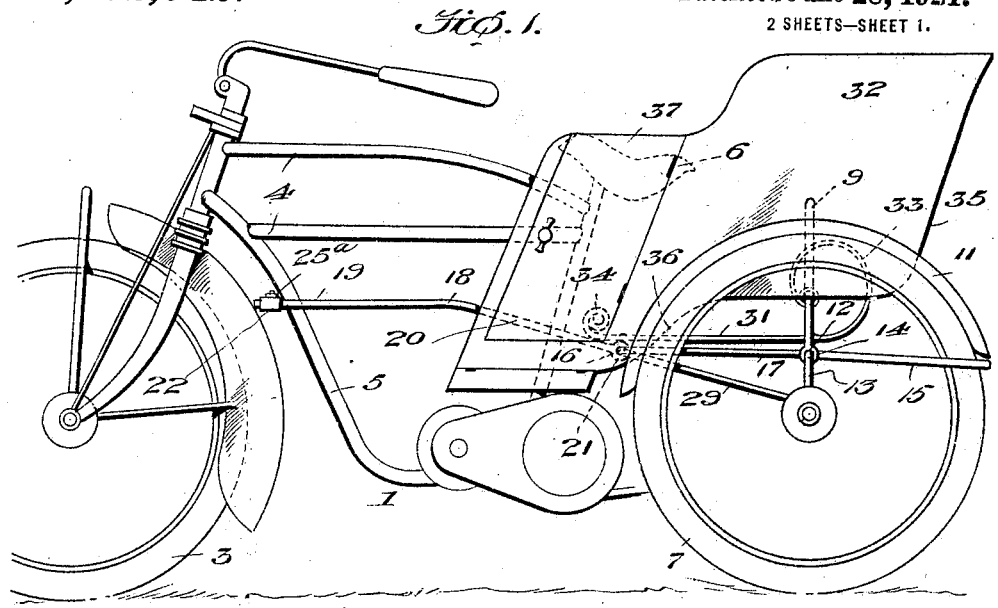
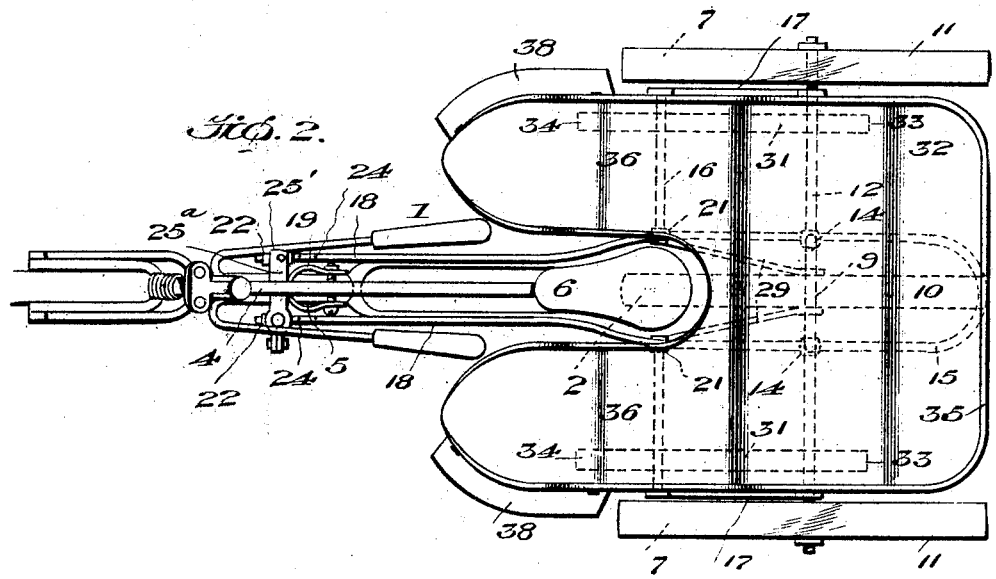

UNITED STATES PATENT OFFICE.

LUCY R. VAN HOOSE, OF ROME, GEORGIA.

WHEELED MOTORCYCLE ATTACHMENT.

1,382,942. Specification of Letters Patent. Patented June 28, 1921.

Application filed May 26, 1916, Serial No. 100,017. Renewed October 9, 1920. Serial No. 415,954.

*To all whom it may concern:*

Be it known that I, LUCY R. VAN HOOSE, a citizen of the United States, residing at Rome, county of Floyd, and State of Georgia, have invented certain new and useful Improvements in Wheeled Motorcycle Attachments, of which the following is a specification.

This invention relates to wheeled motorcycle attachments.

Among the objects of the present invention are the provision of, first, an improved wheeled carrier attachment which may be quickly and easily applied to a motorcycle and used for carrying passengers or goods; second, a carrier attachment for motorcycles whose supporting wheels are located on opposite sides of the rear wheel of the motorcycle, and whose frame is detachably connected to the motorcycle, thereby providing space for the accommodation of two or more passengers or a considerable quantity of goods and assisting in distributing the weight, strain and tractive action on the motorcycle; third, a wheeled carrier attachment for motorcycles which has improved means whereby, though the carrier is firmly attached to the motorcycle frame, its construction, connections and general form and arrangement are such that it can rise and fall freely in respect to the motorcycle so that when traveling over uneven ground, the carrier will adjust itself automatically to differences of level between its wheels and those of the motorcycle, without interfering with the proper action of the latter and by which freedom is obtained in turning curves; fourth, such other improvements and novel combinations and arrangement of parts as will appear more fully hereinafter.

In the accompanying drawings:

Figure 1 is a side elevation showing the wheeled carrier attached to an ordinary motorcycle;

Fig. 2, a plan view;

Fig. 3, a rear elevation;

Fig. 4, a detail perspective of the frame of the wheeled carrier;

Fig. 5, a detail of a hinged joint that may be employed; and

Fig. 6, a detail of the front coupling.

My invention is adapted for attachment to any motorcycle and might be applied to a bicycle. I have shown the invention applied to a motorcycle 1 having rear wheel 2, front steering wheel 3, horizontal frame bars or tubes 4, inclined frame bar 5, and saddle 6.

My wheeled carrier attachment is supported by wheels 7 which are preferably of the same size as the motorcycle wheel 2. The frame bars or members which connect the axles of the wheels 7 are in line with the axle of the wheel 2. The frame members 8 extend upwardly and are connected by a vertical arch 9 which is adapted to straddle the fender 10 of the motorcycle rear wheel 2. The wheels 7 may be provided with fenders 11. Disposed vertically above the axle or frame bar 8 are horizontal frame bars 12 which have depending portions 13 which connect to the axle bar 8 at their lower ends. The inner ends of the horizontal bars 12 connect by any suitable coupling or other means 14 to the bar 8 at the base of the arch 9. The frame is thus trussed, as it were, to withstand the vertical pressure on the wheels 7 occasioned by the weight of the goods or passengers in the carrier.

Extending rearwardly and horizontally from the frame bar 12 is an arch 15 which straddles the wheel fender 10. Extending parallel to the bars 12 are the front bars 16 which are connected by rearwardly extending bars 17 to the bars 12. Angular bars 18 having parts which extend forwardly and substantially parallel to the bar 4 of the motorcycle frame and are connected by a coupling 19 to the inclined frame bar 5 of the motorcycle frame, are provided with downwardly inclined rear parts 20 which are coupled to the front bars 16 at 21.

Sleeves 22 slidably adjustable on the draw bars 18 are adapted to be secured at different points thereon in any suitable manner as, for instance, by pins 23 and holes 24. The sleeves 22 are cross-connected by a yoke 25ᵃ. A stud 26 to which the coupling 19 is rigidly fastened, is rockably mounted on the cross bar. The yoke 25ᵃ is hinged to one sleeve at 25′ and detachably connected to the other sleeve at 27, thus permitting rapid and easy connection to, or disconnection from, the frame bar 5.

Preferably, rigidly coupled by nuts to the ends of the axle 25 of the motorcycle rear wheel 2 are bars 29 which extend forwardly and upwardly therefrom and at their forward ends are connected to the couplings 21 by bolt-and-slot joints 30 which permit sufficient play at these points to compensate for jolts and jars due to uneven ground.

Carriage springs 31 are secured to the frame bars 12 and 16 and extend forwardly and rearwardly. The body 32 which is disposed between the wheels 7, may be braced or constructed in different ways and is connected to and supported by the springs 31; the rear part of the body resting on the rear coils 33 and the foot portions on the small front coils 34.

The body 32 extends across the back of the motorcycle and forwardly on opposite sides thereof, being provided with a continuous seat 35 and with drop portions 36 for the accommodation of the passengers in an easy and comfortable sitting posture, one on each side of the motorcycle. Side doors 37 and steps 38 may be provided so that the passengers may step into the carrier at the respective sides thereof.

The hinge joints provided at 19—26, and 30 enable the entire frame of the carrier to rise or fall.

The carrier may be applied to any motorcycle by attaching the bars 29 to the ends of the axle 25 of the rear wheel 2 and connecting the clamp or fastening 19 to the front frame bar 5, which operation can be accomplished in a very short time, as may also the detachment of the wheeled carrier from the motorcycle.

The arches 9 and 15 brace and make rigid the frame construction of the wheeled carrier. The arch 9 supplements the trussed construction provided by the parts 8 and 12. The arch 15 serves as a truss connecting the frame bars 12.

I am aware that my invention is susceptible of modification, and I do not, therefore, limit myself to the details of construction herein shown and described.

Having thus described my invention, what I claim as new and desire to secure by Letters Patent, is:—

1. A wheeled carrier attachment for motorcycles, comprising a generally horizontal frame having trusses arranged in general vertical disposition, an arch joining said trusses, supporting wheels for the said trussed portions adapted to be disposed on opposite sides of the motorcycle, and means for connecting the frame to the motorcycle.

2. A wheeled carrier attachment for motorcycles, comprising an arch adapted to straddle the rear wheel of the motorcycle, vertically trussed frames extending laterally on opposite sides of said arch, supporting wheels for said trussed frames adapted to be disposed on opposite sides of the motorcycle, and means for coupling the carrier frame to the motorcycle.

3. A wheeled carrier attachment for motorcycles, comprising an arch adapted to straddle the rear wheel of the motorcycle, vertically trussed frames extending laterally on opposite sides of said arch, supporting wheels for said trussed frames adapted to be disposed on opposite sides of the motorcycle, a horizontally extending arch connecting the trussed frames aforesaid, and means for coupling the carrier frame to the motorcycle.

4. A wheeled carrier attachment for motorcycles comprising a vertically trussed frame having an arch adapted to straddle the rear wheel of the motorcycle, supporting wheels for said frame adapted to be disposed on opposite sides of the motorcycle, a horizontally extending arch for the horizontal portion of said carrier frame, coupling bars having means adapted for detachable connection to the frame of the motorcycle, and coupling bars hinged to the frame and adapted for detachable connection to the axle of the rear wheel of the motorcycle, said hinged joints of said coupling means aforesaid being adapted to permit the frame of the carrier to rise and fall in relation to the motorcycle.

5. A wheeled carrier attachment for motorcycles comprising a generally horizontal frame having trusses arranged in general vertical disposition, an arch joining said trusses, supporting wheels for said trussed portions adapted to be disposed on opposite sides of the motorcycle, a body operatively supported by the frame, and means for connecting the frame to the motorcycle.

6. A wheeled carrier attachment for motorcycles comprising a generally horizontal frame having trusses arranged in general vertical disposition, an arch joining said trusses, supporting wheels for said trussed portions adapted to be disposed on opposite sides of the motorcycle, springs supported by the frame adjacent the sides thereof, and a body mounted on the springs.

7. A wheeled carrier attachment for motorcycles comprising a generally horizontal frame having trusses arranged in general vertical disposition, an arch joining said trusses, supporting wheels for said trussed portions adapted to be disposed on opposite sides of the motorcycle, a body operatively supported by the frame, and means for connecting the frame to the motorcycle, said body having its rear portion extending across the back of the motorcycle when applied, the front end portion of the body extending forwardly at opposite sides of said motorcycle.

In testimony whereof, I hereunto affix my signature.

LUCY R. VAN HOOSE.